March 17, 1931. W. B. FLANDERS 1,796,325
TURBINE CASING
Filed Sept. 10, 1929
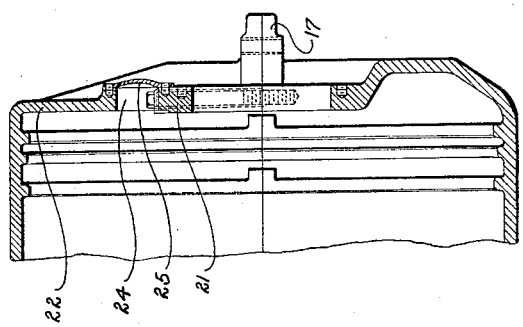
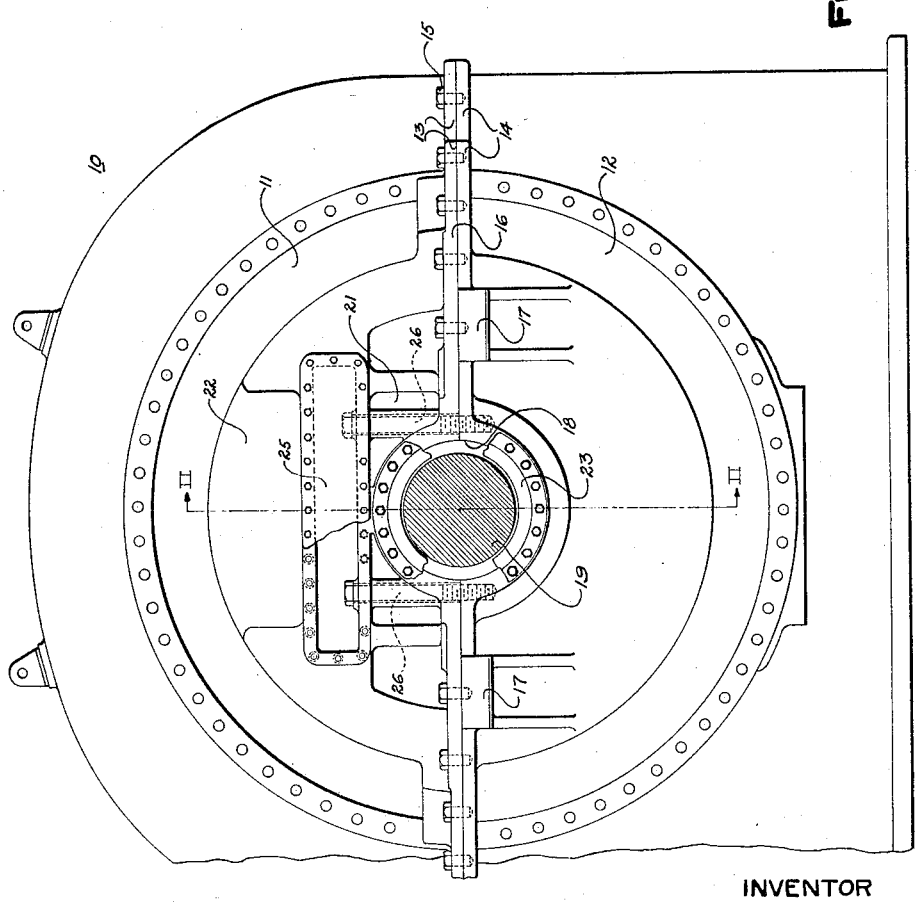
INVENTOR
W.B. FLANDERS.
BY
*a. B. Reavis*
ATTORNEY Patented Mar. 17, 1931

1,796,325

UNITED STATES PATENT OFFICE

WARREN B. FLANDERS, OF PHILADELPHIA, PENNSYLVANIA, ASSIGNOR TO WESTINGHOUSE ELECTRIC & MANUFACTURING COMPANY, A CORPORATION OF PENNSYLVANIA

TURBINE CASING

Application filed September 10, 1929. Serial No. 391,542.

My invention relates to an elastic fluid turbine, more particularly to the casing for an elastic fluid turbine of large size, and it has for its object to eliminate difficulties arising from distortion due to unequal heating of the parts of the casing.

In an end wall of a turbine casing having a shaft opening in the center thereof, the inner or central portion of the end wall, adjacent the shaft opening, does not always tend to expand to the same extent as the surrounding outer portion. This is due to differences in temperature of said portions, which may be caused, for example, by cooling of the inner portion by a liquid sealing gland at the shaft opening. Upon expansion of the outer portion the inner portion is placed under tension. Where the casing is divided along a plane containing the axis and traversing the end wall and a joint is formed along said plane, the expansion of the outer portion tends to draw the parts forming the inner portion apart at the joint and tending to open said joint at the inner portion.

It is a more particular object of my invention, therefore, to provide means permitting relative expansion and contraction of the inner and outer portions of the end wall, thereby relieving the inner portion of the forces tending to open the joint.

In accordance with my invention, one of the casing halves formed by dividing the casing is constructed in such a way to permit relative movement between the parts thereof lying in the inner and outer portions of the end wall. This is preferably accomplished by forming a slot between the inner and outer portions and extending in a general direction parallel to the joint. The outer portion may, upon expansion, draw away from the inner portion, without placing any tension thereon tending to open the joint. The slot is covered in any suitable manner to prevent leakage of fluid therethrough.

The above and other objects are effected by my invention, as will be apparent from the following description and claims taken in connection with the accompanying drawing, forming a part of this application, in which:

Fig. 1 is an end elevation, showing the end wall of a turbine casing constructed in accordance with my invention; and, Fig. 2 is a longitudinal section through the end wall.

Referring now to the drawing more in detail, I show a horizontal elastic fluid turbine 10. The casing of the turbine is divided along the horizontal plane of the axis into an upper half 11 and a lower half 12. The casing halves are provided with flanges 13 and 14, secured together by bolts 15, thus forming a joint 16 securing the casing halves together. The lower half 12 is provided with lugs 17 which rest upon suitable supporting structure (not shown) for supporting the casing. The joint extends across the end wall of the casing, and across the shaft opening 18 formed in the center of the end wall and through which the rotor shaft 19 extends. The numeral 21 is used to indicate the inner portion of the end wall surrounding the shaft and the numeral 22 is used to indicate the outer portion surrounding the inner portion. A liquid sealing gland 23 is provided at the shaft opening to prevent leakage of fluid between the shaft and the edge of the shaft opening.

The inner portion 21 of the end wall is often maintained at a lower temperature than the outer portion 22. This may be due to any one of several causes, and in the present embodiment it will be considered as caused by the cooling effect of the liquid in the liquid sealing gland 23. The expansion of the outer portion upon greater temperature in operation tends to draw the inner portion 21 radially outward, placing tension stresses thereon extending in all radial directions. Those tension stresses which cross the joint tend to open the joint, and to unduly stress the bolts 15 at the inner portion.

I therefore form a slot 24 in the part of the end wall formed by the upper half 11. This slot is disposed between the inner and outer portions, and extends substantially parallel to the joint 16. A cover plate 25 is bolted over the slot 24. Additional long bolts 26 are provided to firmly clamp together the parts of the upper and lower halves formnig the inner portions to avoid opening of the joint.

When the outer portion 22 of this construction expands, the slot 24 permits the parts of the outer portion formed by the upper half 11 to be drawn away from the inner portion 21. The upper and lower parts of the inner portion 21 are firmly clamped together and may be slightly distorted by the lower parts of the outer portion 22; however, there are no great tension stresses closing the joint 15 tending to open the same.

It will thus be seen that I have provided means for permitting substantially independent expansion and contraction of the inner and outer portions of the end wall of the turbine casing, thereby relieving the inner portions of the tension stresses tending to open the horizontal joint.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. An elastic fluid turbine casing divided into halves along a plane containing the axis of the turbine, said casing being formed with a shaft opening at said plane and with a slot in one of said halves, said slot being disposed adjacent to and radially outwardly of the shaft opening and extending approximately parallel to said plane.

2. An elastic fluid turbine casing divided on a plane containing the axis of the turbine and including an end wall having a shaft opening at the plane of division, one of said halves having a slot in the end wall between the radially inner and outer portions of the end wall to permit independent expansion and contraction of said inner and outer portions, and means closing said slot to prevent leakage of fluid therethrough but permitting movement between opposite sides of the slot.

3. An elastic fluid turbine casing divided on a plane containing the axis of the turbine and including an end wall having a shaft opening at the plane of division, one of said halves having a slot in the end wall disposed between the radially inner and outer portions of the end wall and extending roughly parallel to the plane of division to permit independent expansion and contraction of said inner and outer portions, and means for closing said slot.

4. An elastic fluid turbine casing divided on a plane containing the axis of the turbine and including an end wall having a shaft opening at the plane of division, and expansion joint means connecting the parts of one of the casing halves lying in the radially inner and outer portions of the end wall.

5. An elastic fluid turbine casing divided on a plane containing the axis of the turbine and including an end wall having a shaft opening at the plane of division, one of the casing halves being formed with expansion joint means in the end wall permitting the portion adjacent the shaft opening on the side thereof opposite the other casing half to be drawn away from the portion lying radially outwardly thereof.

6. An elastic fluid turbine casing having an end wall in which there is a shaft opening, and expansion joint means connecting the radially inner and outer portions of the end wall.

In testimony whereof, I have hereunto subscribed my name this 5th day of September, 1929.

WARREN B. FLANDERS.